United States Patent Office 3,328,473
Patented June 27, 1967

3,328,473
PROCESS FOR ARYLATION OF ORGANIC COMPOUNDS
Ernest Bryson McCall and Edward John Blackman, Llangollen, Wales, assignors to Monsanto Chemicals Limited, London, England, a British company
No Drawing. Filed Jan. 24, 1962, Ser. No. 168,500
8 Claims. (Cl. 260—649)

This invention relates to a new process by which an aromatic compound can be arylated.

By arylation of a compound is meant the introduction of an aromatic group, that is to say the group remaining on removal of a nuclear hydrogen atom from a cyclic system that is stabilized by the presence of non-localized $\pi$-electrons, for instance a phenyl group or a pyridyl group. A typical arylation is, for instance, the introduction of a phenyl group into diphenyl to produce a terphenyl.

The introduction of an aromatic group such as, for instance, a phenyl group does, in principle, constitute an important reaction, and the formation of a terphenyl referred to above is of course only one example of the type of compound that can be produced. The terphenyls and other related compounds are themselves valuable products, by virtue of the fact that they are stable liquids at elevated temperatures. The terphenyls are of particular significance in that they are also materials which are stable to the effects of atomic radiation and which possess good neutron-moderating properties. They can accordingly be employed as functional fluids, for instance as moderator-coolants, in nuclear reactors.

The arylation reaction that has now been discovered provides a new route to many aromatic compounds, which are obtained in excellent yields.

The process of the invention is one for the arylation of an aromatic compound, in which the compound is reacted with an N-acylated primary aromatic amine at an elevated temperature in the presence of a nitrosating agent.

The elevated temperature at which the process is carried out is normally one higher than 40° C., for example one within the range of 50° to 150° C. Good results are obtained using a reaction temperature in the range 60° to 100° C., for instance 65° C., 75° C. or 90° C.

The aromatic compounds that can be arylated are compounds that possess a cyclic system that is stabilized by the presence of non-localized $\pi$-electrons. Such compounds include the carbocyclic compounds such as benzene and condensed benzenoid systems such as for instance naphthalene, and aromatic compounds having a heterocyclic ring such as for instance furan, thiophene and pyridine. More than one ring or type of ring can be present in the compound, for instance the compound can be a diphenyl, diphenyl ether, benzothiophene or dibenzothiophene, and where this is so, arylation can take place in all or any of the rings. In general the aromatic compound can contain a substituent, for example an aliphatic group, for instance an alkyl group, such as a methyl, ethyl or octyl group, a cycloalkyl group, such as a cyclohexyl group, or an alkoxy group, such as a methoxy, ethoxy or butoxy group; a halogen atom, for example chlorine or bromine; or a carboxylic ester group, for example an ethoxycarbonyl group. Specific examples of aromatic compounds including substituted ones are: benzene, toluene, the xylenes, ethylbenzene, dodecylbenzene, diphenyl, o-, m- and p-terphenyl, 2-methyldiphenyl, 4,4'-diisopropyldiphenyl, naphthalene, 1,6-dimethylnaphthalene, indene, anthracene, chlorobenzene, 4-chlorodiphenyl, anisole, phenetole, diphenyl ether, 2-phenylthiophene, thiophene-2-carboxylic ethyl ester, 4-phenylbenzofuran, dibensofuran, 1-cyclohexyldibenzothiophene, 2-phenyldibenzothiophene, 2-phenoxydibenzothiophene, and quinoline.

The aromatic residue of the N-acylated primary aromatic amine can, in principle, be one derived from any of the aromatic compounds referred to above as capable of being arylated in the process of the invention, for example one containing a carbocyclic aromatic radical such as a phenyl or a condensed benzenoid radical such as naphthyl, or an aromatic radical having a heterocyclic ring such as a furyl, thienyl or pyridyl radical. More than one type of ring can be present in the aromatic residue, for instance it can contain a diphenylyl benzothienyl, dibenzothienyl or quinolinyl radical. In general the aromatic residue can contain a substituent, for example an aliphatic group, for instance an alkyl or cycloalkyl group, such as a methyl, octyl, nonyl or cyclohexyl group, or an alkoxy group, such as a methoxy or ethoxy group; or a halogen atom, for instance chlorine or bromine. In practice however, it is preferred that the aromatic residue of the N-acylated primary aromatic amine be a relatively simple group such as phenyl, lower alkylphenyl or halophenyl where the halogen is, for example, chlorine or bromine. It should also be pointed out that the process of the invention is operable where the arylating agent contains more than one N-acylated primary amino group. In such cases the aforesaid aromatic residue would be such as phenylene or a substituted phenylene with the above mentioned substituents.

Good results are obtained when the N-acyl group is an aliphatic acyl group, particularly a lower alkanoyl group, for example a formyl, acetyl, propionyl or butyryl group.

Specific examples of N-acylated primary aromatic amines are: acetanilide, acet-p-toluidide, N-n-propionyl-p-phenetidine, N-isobutyryl-$\beta$-naphthylamine, N,N'-diacetyl-p-phenylenediamine, N,N'-diacetylbenzidine and 3-acetyl-amniopyridine.

Nitrosating agents that can be employed in the process of the invention include for example the alkyl nitrites, such as methyl nitrite, ethyl nitrite, isopropyl nitrite, n-amyl nitrite, n-octyl nitrite, n-decyl nitrite, etc.; the oxides of nitrogen, such as nitrogen trioxide (nitrous fumes, which can for instance be generated in situ by reaction of an acid with an aqueous solution of sodium nitrite) or dinitrogen tetroxide; and the nitrosyl halides, such as nitrosyl chloride, nitrosyl bromide and nitrosyl fluoride.

In general the preferred nitrosating agents are the nitrosyl halides, in particular nitrosyl chloride. While other nitrosating agents, for example the alkyl nitrites and the oxides of nitrogen, give very satisfactory results where the N-acylated primary aromatic amine has a comparatively simple structure, for example any of the specific examples listed above, and where the aromatic compound to be arylated is likewise comparatively simple, for example benzene, toluene or diphenyl, they tend to be slightly less suitable as nitrosating agents where the reactants are more complex, for example when nuclear substituents other than alkyl groups are present, or where the compound to be arylated is heterocyclic, for example, a dibenzthiophene or dibenzofuran.

Usually an excess of the compound to be arylated is employed relative to the quantity of N-acylated primary aromatic amine, although this is not essential. The excess can, in some instances, be quite small, but is preferably at least twice the molar equivalent and can for example be within a range of 5 to 25 times the molar equivalent, for instance about 10 to 20 times.

Normally the process is carried out by dissolving or suspending the N-acylated primary aromatic amine in the compound to be arylated and adding the nitrosating agent. A diluent can be present if desired, for instance an inert organic solvent such as a paraffinic hydrocarbon. Under certain conditions, a buffering agent such as sodium acetate can, with advantage, be included as a component of the reaction mixture. An alternative procedure which is available, for example when the nitrosating agent is an oxide of nitrogen, comprises the generation of the nitrosating agent in situ. Thus in appropriate instances the process can be carried out for example by acidifying an aqueous phase containing a nitrite, for instance sodium nitrite, in the presence of an organic phase containing the N-acylated primary aromatic amine and the organic compound which it is required to arylate.

Generally the addition of the nitrosating agent to the other reactants is made gradually, for example over a period of several hours. In some instances, the nitrosating agent can be added rapidly and the mixture subsequently maintained at the reaction temperature for the required period.

The product of the process of the invention is often a mixture of isomers; appropriate arylation of diphenyl, for example, gives a mixture of o-, m- and p-terphenyl. In many instances, such as for use as a functional fluid, it is not essential that such isomers should be separated from each other, but simply that, for example, they should be isolated as a mixture from unchanged starting materials. If necessary, however, it is normally practical to separate a mixture of isomers, for example by chromatography or by fractional crystallization.

The process of the invention is illustrated by the following examples.

*Example 1*

This example describes the preparation of a mixture of terphenyls (the o-, m- and p-isomers) by the action of amyl nitrite on acetanilide in the presence of diphenyl.

16.4 grams (0.14 mol.) of amyl nitrite were added over a period of about ¼ hour to a solution of 13.5 grams (0.1 mol.) of acetanilide in 250 grams (1.16 mol.) of molten diphenyl at a temperature of 85° C. The solution was stirred and maintained at 85°–90° C. for 5 hours. Fractional distillation of the product gave 230 grams of unchanged diphenyl and 15.9 grams (69% yield based on the amount of acetanilide) of terphenyls having a boiling range of 140° to 188° C. at 0.5 mm. of mercury pressure. The terphenyls solidified to a wax-like material on cooling.

*Example 2*

This example describes the preparation of terphenyl from diphenyl and acetanilide using "nitrous fumes" as the nitrosating agent.

Nitrous fumes were generated in situ by the gradual addition over a period of 7 hours of a 10% by weight aqueous solution of sulphuric acid to a two-phase system maintained at 75° C. and comprising as a lower layer an aqueous solution containing 48.3 grams (0.7 mol.) of sodium nitrite, and as an upper layer a solution of 18.9 grams (0.14 mol.) of acetanilide in 350 grams (2.28 mol.) of diphenyl. The two layers were separated and the yield of terphenyls obtained by fractional distillation of the organic phase was 20.2 grams (62.8% yield based on the weight of acetanilide).

*Example 3*

This example describes the preparation of terphenyls from diphenyl and acetanilide using dinitrogen tetroxide as the nitrosating agent.

A stream of nitrogen was passed into 9.7 grams (0.11 mol.) of liquid dinitrogen tetroxide and was then led with the entrained dinitrogen tetroxide into a solution of 18.9 grams (0.14 mol.) of acetanilide in 350 grams (2.28 mol.) of diphenyl containing 17.4 grams of anhydrous sodium acetate at a temperature of 75° C. The velocity of the nitrogen stream was controlled so that the volatilization of the dinitrogen tetroxide was extended over a period of 7 hours. The yield of terphenyls isolated by fractional distillation of the reaction product was 17.1 grams (53.2% based on the amount of acetanilide).

*Example 4*

This example describes the preparation of terphenyls from diphenyl and acetanilide using nitrosyl chloride as the nitrosating agent.

The procedure was similar to that described in Example 3 but with the dinitrogen tetroxide of that example replaced by 9.8 grams (0.21 mol.) of nitrosyl chloride. The reaction period was 5½ hours, and the yield of terphenyls was 18.4 grams (57.3% based on the amount of acetanilide).

*Example 5*

This example describes the preparation of diphenyl by the action of amyl nitrite on acetanilide in the presence of benzene.

8.2 grams (0.07 mol.) of amyl nitrite and 6.7 grams (0.05 mol.) of acetanilide were dissolved in 500 cc. of benzene, and the solution was boiled under reflux, giving a reaction temperature of about 80° C., for 9 hours. After distillation of the excess benzene and amyl nitrite from the reaction mixture the solid which remained was recrystallized from ethanol to give 4.5 grams (58% yield based on the amount of acetanilide) of diphenyl having a melting point of 69–70° C.

*Example 6*

This example describes the preparation of p-chlorodiphenyl by the action of amyl nitrite on p-chloracetanilide in the presence of benzene.

8.2 grams (0.07 mol.) of amyl nitrite and 8.5 grams (0.05 mol.) of p-chloracetanilide were dissolved in 500 cc. of benzene and the solution was boiled under reflux, giving a reaction temperature of about 80° C., for 10 hours. After distillation of the excess benzene and amyl nitrite from the reaction mixture, the solid which remained was recrystallized from ethanol to give 1.8 grams (19% yield based on the amount of p-chloracetanilide) of p-chlorodiphenyl having a melting point of 75–76° C.

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A process for arylating an aromatic compound selected from the group consisting of benzene, naphthalene, diphenyl, diphenyl ether, and the corresponding alkyl and halogen substituted compounds, which comprises heating, at a temperature or from about 50° C. to about 150° C., the aromatic compound to be arylated with an N-lower alkanoyl primary aromatic amine and a nitrosating agent.

2. A process as defined in claim 1 wherein the nitrosating agent is selected from alkyl nitrites, oxides of nitrogen and nitrosyl halide.

3. A process as defined in claim 1 wherein said amine has up to two N-lower alkanoyl primary amino groups thereon, and the aromatic group of said amine is selected from the group consisting of phenyl, phenylene, lower alkylphenyl, lower alkylphenylene, halophenyl and halophenylene.

4. A process as defined in claim 3 wherein the nitrosating agent is selected from alkyl nitrites, oxides of nitrogen and nitrosyl halide.

5. A process which comprises heating benzene with an N-lower alkanoyl primary aromatic amine and a nitrosating agent, said heating being at a temperature of from about 50° C. to about 150° C.

6. A process as defined in claim 5 wherein the nitrosating agent is nitrosoyl chloride.

7. A process which comprises heating diphenyl with an N-lower alkanoyl primary aromatic amine and a nitrosating agent, said heating being at a temperature of from about 50° C. to about 150° C.

8. A process as defined in claim 7 wherein the nitrosating agent is nitrosoyl chloride.

References Cited

UNITED STATES PATENTS

| | | | |
|---|---|---|---|
| 2,301,206 | 11/1942 | France et al. | 260—670 |
| 3,080,434 | 3/1963 | Odioso et al. | 260—670 |

OTHER REFERENCES

Wagner et al.: "Synthetic Organic Chem.," pp. 739 to 742 (1953).

LEON ZITVER, *Primary Examiner.*

K. H. JOHNSON, J. W. WILLIAMS,

*Assistant Examiners.*